United States Patent
Proctor et al.

(10) Patent No.: US 8,024,281 B2
(45) Date of Patent: Sep. 20, 2011

(54) ALPHA NODE HASHING IN A RULE ENGINE

(75) Inventors: Mark Proctor, Chiswick (GB); Edson Tirelli, São Paulo (BR)

(73) Assignee: Red Hat, Inc., Raleigh, NC (US)

( * ) Notice: Subject to any disclaimer, the term of this patent is extended or adjusted under 35 U.S.C. 154(b) by 750 days.

(21) Appl. No.: 12/074,102

(22) Filed: Feb. 29, 2008

(65) Prior Publication Data

US 2009/0222386 A1    Sep. 3, 2009

(51) Int. Cl.
 G06F 17/00 (2006.01)
 G06F 7/00 (2006.01)
 G06F 17/30 (2006.01)
 G06N 5/02 (2006.01)
(52) U.S. Cl. .......................................... 706/47; 707/747
(58) Field of Classification Search .................. 706/47
See application file for complete search history.

(56) References Cited

U.S. PATENT DOCUMENTS 7,089,239 B1 * 8/2006 Baer et al. ............................ 1/1
 2008/0077464 A1 * 3/2008 Gottlieb et al. ................... 705/8
 2008/0109392 A1 * 5/2008 Nandy ............................. 706/47

OTHER PUBLICATIONS

Charles L. Forgy, "RETE: A Fast Algorithm for the Many Pattern/Many Object Pattern Match Problem". [Online] Downloaded Jan. 27, 2011. Artificial Intellengence, vol. 19, Issue 1, Sep. 1982, pp. 17-37. https://cit-server.cit.tu-berlin.de/~battre/db.rdf.forgy.90.rete.pdf.*

* cited by examiner

*Primary Examiner* — Jeffrey A Gaffin
*Assistant Examiner* — Ben M Rifkin
(74) *Attorney, Agent, or Firm* — Lowenstein Sandler PC

(57) ABSTRACT

Some embodiments of alpha node hashing in an exemplary rule engine have been presented. In one embodiment, constraints are added into a constraint set in response to requests from one or more users of a rule engine. The rule engine then determines which constraints within the constraint set are mutually exclusive. Furthermore, the rule engine dynamically enables hashing of facts asserted into a working memory of the rule engine in response to a current number of the mutually exclusive constraints.

20 Claims, 7 Drawing Sheets

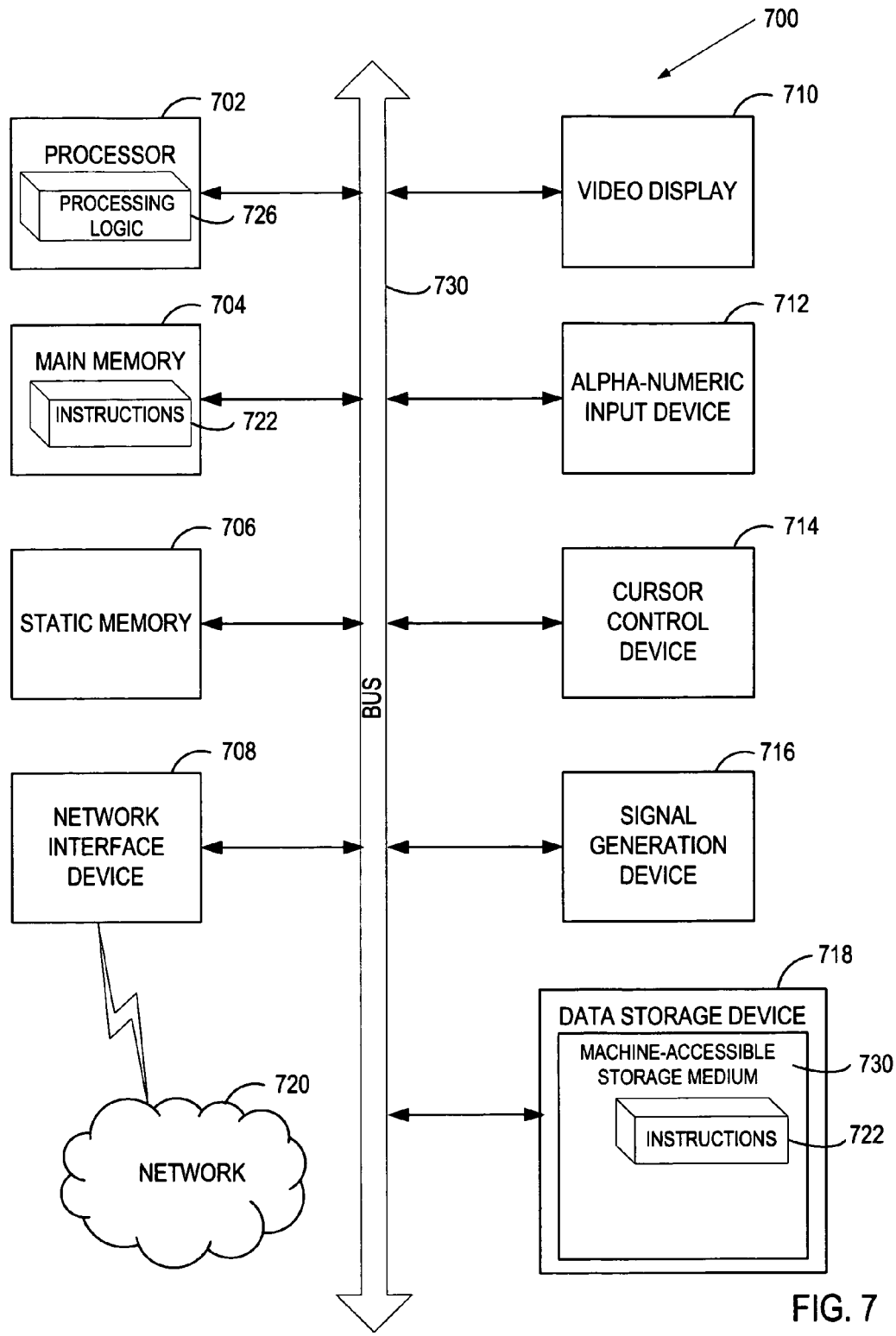

ALPHA NODE HASHING IN A RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts). A rule is a logical construct for describing the operations, definitions, conditions, and/or constraints that apply to some predetermined data to achieve a goal. Various types of rule engines have been developed to evaluate and process rules. Conventionally, a rule engine implements a network to process rules and data objects, such as a Rete network. A network may include many different types of nodes, including, for example, object-type nodes, alpha nodes, left-input-adapter nodes, eval nodes, join nodes, not nodes, and terminal nodes, etc.

In a Rete network, alpha nodes are responsible for evaluating the constraints that are self-contained to a single fact. Such constraints are also referred to as Alpha Constraints. For example, an exemplary literal constraint is: Customer (type=="VIP"), where the "type" attribute of each Customer fact is compared to the constant string "VIP." If the "type" attribute of a Customer fact is equal to "VIP," then the constraint evaluates to true. Otherwise, the constraint evaluates to false. Such constraints do not depend on other facts present in the working memory. In other words, these constraints do not require joins to other facts.

Conventionally, a Rete rule engine creates an alpha node for each of these constraints. When a new fact is asserted into the engine, the engine evaluates all constraints in sequence. For instance, an exemplary rulebase contains eight rules, each with one alpha constraint in the form of:

Rule 1: Customer(type=="some value 1")
Rule 2: Customer(type=="some value 2")
...
Rule 8: Customer(type=="some value 8")

For each Customer fact asserted into the working memory of the Rete rule engine, all of the above eight constraints are evaluated, even though only one of them may be activated, if matched. FIG. 1 illustrates a conceptual diagram of the evaluation of a fact asserted into the rule engine. There are eight constraints 110-118 in the rulebase, and the fact 120 asserted is evaluated against each of the eight constraints 110-118 as indicated by the lines between the fact 120 and the constraints 110-118. Thus, if a thousand (1000) facts are asserted into the rule engine, the rule engine may perform up to eight thousands (i.e., 8×1000=8000) constraint evaluation.

BRIEF DESCRIPTION OF THE DRAWINGS

The present invention is illustrated by way of example, and not by way of limitation, in the figures of the accompanying drawings and in which:

FIG. 7 illustrates a block diagram of an exemplary computer system.

DETAILED DESCRIPTION

Figure 1:
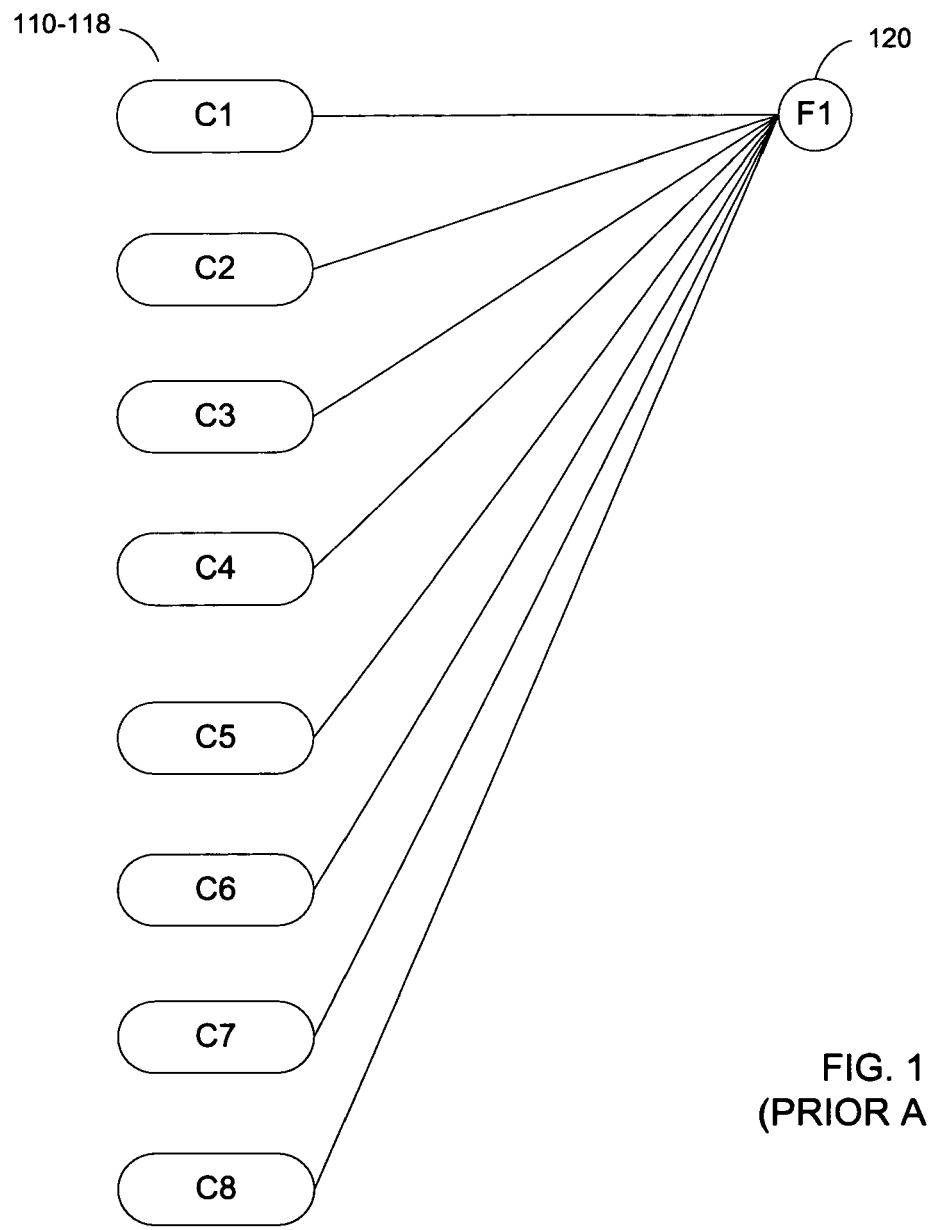
FIG. 1 illustrates a conceptual diagram of the evaluation of a fact asserted into the rule engine.

Described herein are some embodiments of alpha node hashing in a rule engine. In one embodiment, constraints are added into a constraint set in response to requests from one or more users of a rule engine. For example, a user may add a business rule into a rule repository of the rule engine, which derives a constraint from the business rule and adds the constraint into the constraint set. The rule engine then determines which constraints within the constraint set are mutually exclusive. Furthermore, the rule engine dynamically enables hashing of facts asserted into a working memory of the rule engine in response to a current number of the mutually exclusive constraints. More details of some embodiments of the rule engine and alpha node hashing are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 2A:
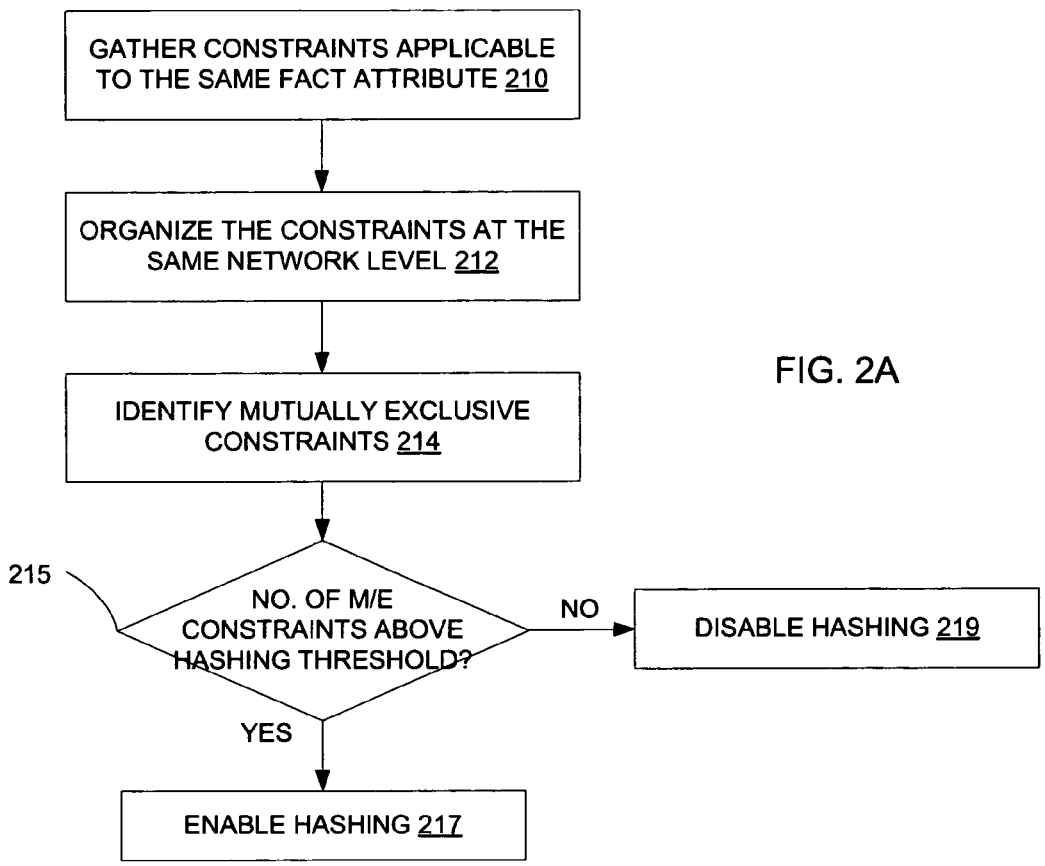
FIG. 2A illustrates one embodiment of a process to dynamically enable alpha node hashing.

FIG. 2A illustrates one embodiment of a process to dynamically enable alpha node hashing in a rule engine. The process may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the process in some embodiments.

As previously discussed, a rule engine may generate a network (e.g., a Rete network) to process rules. The set of rules may be provided by a user of a rule engine. For example, in a business application (e.g., mortgage business, health management, etc.), the set of rules includes business rules pertaining to the relevant business transactions (e.g., rules on qualifying mortgage applicants, rules on approving certain preventive treatment and/or procedures, etc.). In some embodiments, the network includes a number of nodes. Some of the nodes are alpha nodes, which are responsible for evaluating constraints derived from some of the patterns in some of the rules (a.k.a. Alpha Constraints), which are self-contained to a single fact. A fact generally refers to a data object that may be asserted into the rule engine to be evaluated against some rules and/or constraints derived from the rules. A fact typically has one or more attributes, which are generally characteristics of the fact. Alpha constraints do not depend on other facts asserted into the rule engine. In other words, alpha constraints do not require joins to other facts. One example of such a constraint is: Patient(gender=="Male"), where the "gender" attribute of each Patient fact is compared to the constant string "Male." It should be apparent that any Patient fact may be evaluated against the above constraint independent of other facts.

Referring to FIG. 2A, processing logic gathers constraints applicable to the same fact attribute (processing block 210). In some embodiments, processing logic organizes the constraints gathered at the same network level of the network (processing block 212). Note that there may be multiple alpha nodes at different levels of the network. In some embodiments, alpha node hashing is applied among constraints on the same level in the network. Further, alpha node hashing may be applied multiple times, one at each set of mutually exclusive constraints on a given level of the network. In some embodiments, the alpha nodes may be re-ordered to increase hashing by placing all related hashable constraints on the same level. Then processing logic identifies which of the constraints gathered are mutually exclusive (processing block 214). Broadly speaking, Constraint A and Constraint B are mutually exclusive if Constraint A and Constraint B cannot be evaluated to true simultaneously on the same fact. For example, Constraint A is Patient(gender=="Male"), and Constraint B is Patient(gender=="Female"). Since only one of Constraint A and Constraint B can be evaluated to true on the same Patient fact, Constraint A and Constraint B in this example are mutually exclusive. For constraints that use the equal to evaluator ("=="), processing logic may readily identify which constraints are mutually exclusive. In some embodiments where other evaluators are used (e.g., greater than, less than, etc.), processing logic performs more sophisticated analysis to identify mutually exclusive constraints. In some embodiments, each set of evaluators may define their own rules for determining mutually exclusiveness. For instance, in the presence of relational evaluators (e.g., >,>=, <,<=, etc.) for integer numbers, a range analysis is executed as follows: suppose one constraint is "Checking for Person( age>=10 && age<30) and another constraint is "Checking for Person(age>=30 && age<50); because no number can satisfy both constraints at the same time, these two constraints are mutually exclusive. Similar approach is applied to all evaluators for which criteria of mutually exclusiveness may be implemented.

In some embodiments, processing logic determines if the number of mutually exclusive constraints is above a predetermined hashing threshold (processing block 215). The predetermined hashing threshold may be set by an administrator of the rule engine based on various factors, such as available computing resources, type of application, usage history of the rule engine, etc. If the number of mutually exclusive constraints is above the predetermined hashing threshold, processing logic enables alpha node hashing in the rule engine for that constraint set (processing block 217). More details of some embodiments of alpha node hashing are discussed below. Otherwise, if the number of mutually exclusive constraints is not above the predetermined hashing threshold, processing logic disables alpha node hashing in the rule engine (processing block 219). Then the rule engine may evaluate the constraints in a conventional manner.

Figure 2B:
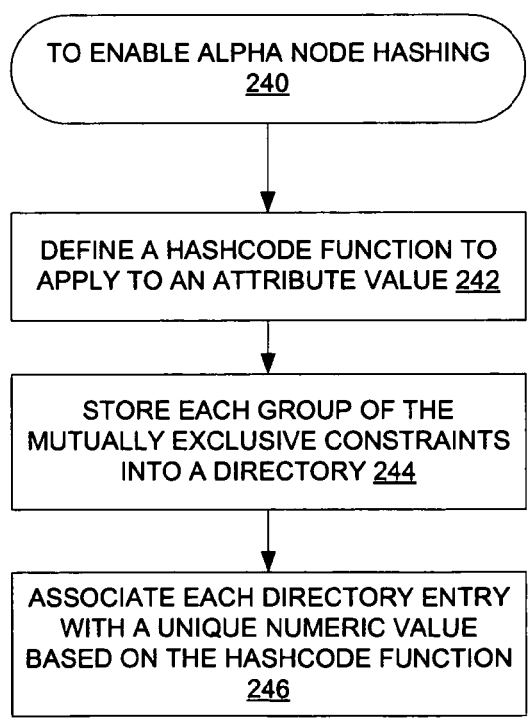
FIG. 2B illustrates one embodiment of a process to evaluate a fact asserted when alpha node hashing is enabled.

FIG. 2B illustrates one embodiment of a process to enable alpha node hashing in a rule engine. The process may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the process in some embodiments.

Referring to FIG. 2B, the process begins to enable alpha node hashing (processing block 240). Processing logic defines a hashcode function to apply to an attribute value of a fact (processing block 242). Further, processing logic stores each group of the mutually exclusive constraints into a directory (processing block 244). A directory as used herein broadly refers to any logical storage unit usable to hold one or more directory entries, where each directory entry is a pair composed of a key (such as an identifying numeric value) and a list of values of the constraints. Then based on the hashcode function defined, processing logic associate each directory entry with a unique numeric value (processing block 246). Specifically, the unique numeric value of a directory entry is a hash value generated by the hashcode function when the hashcode function is applied to an attribute value of a fact, that when evaluated against the constraints in the corresponding directory entry, may cause the constraints in the directory to evaluate to true. With alpha node hashing enabled, the rule engine may evaluate constraints more efficiently when the number of mutually exclusive constraints is above the predetermined hashing threshold.

Figure 2C:
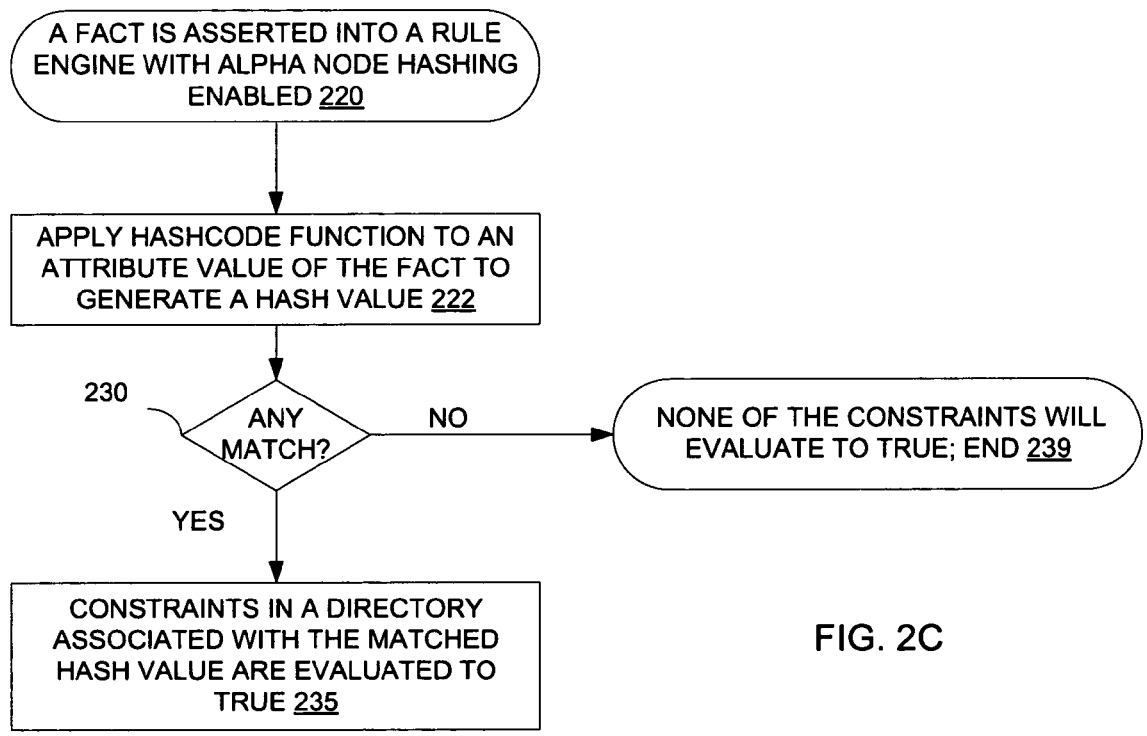
FIG. 2C illustrates one embodiment of a process to evaluate a fact asserted against constraints when alpha node hashing is enabled.

FIG. 2C illustrates one embodiment of a process to evaluate a fact asserted against constraints when alpha node hashing is enabled. The process may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the process in some embodiments.

The process begins when a fact is asserted into a rule engine with alpha node hashing enabled (processing block 220). Processing logic applies a hashcode function to an attribute value of the fact to generate a hash value (processing block 222). Processing logic then checks if there is a match between the numeric values assigned to the directory entries of the mutually exclusive constraints and the hash value generated by the hashcode function (processing block 230). If there is no match, then none of the constraints will be evaluated to true, and hence, the process ends (processing block 239). Otherwise, if there is a match, then processing logic evaluates the constraints in a directory associated with the hash value to true (processing block 235). To further illustrate the above technique, an example of alpha node hashing is discussed in details below.

Figure 3:
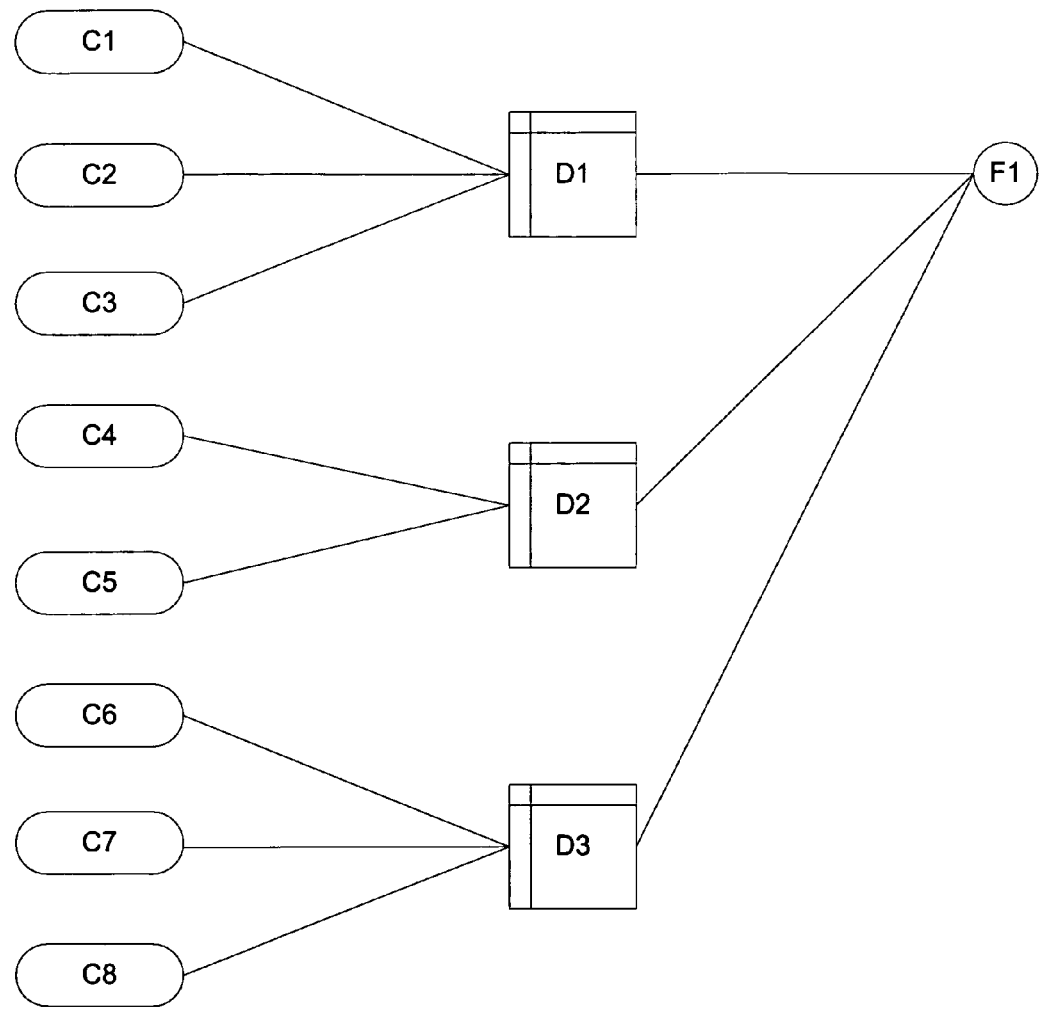
FIG. 3 shows one a conceptual diagram of one embodiment of the evaluation of a fact asserted into a rule engine with alpha node hashing enabled.

FIG. 3 shows one example of constraint evaluation in one embodiment of a rule engine with alpha node hashing enabled. In the current example, there are eight constraints C1-C8, which are applied to the same fact attribute. The rule engine examines the constraints C1-C8 and identifies three (3) groups of mutually exclusive constraints among C1-C8. Specifically, constraints C1-C3, constraints C4-C5, and constraints C6-C8 are mutually exclusive. If the hashing threshold is set to be three (3), then the rule engine does not enable alpha node hashing because the number of mutually exclusive constraints is not above the hashing threshold. In another example, an additional mutually exclusive constraint C9 (not shown) may be added to the set of constraints, causing the number of mutually exclusive constraints to rise to four (4). Because 4 is above the hashing threshold (i.e., 3), the rule engine enables alpha node hashing in response to the addition of constraint C9. However, if the hashing threshold is set to be two (2), then the rule engine enables alpha node hashing because the number of mutually exclusive constraints is above the hashing threshold. For the following discussion, suppose the hashing threshold is set to be 2 and there are only constraints C1-C8. Because the number of mutually exclusive constraint sets (i.e., 3) is above the hashing threshold (i.e., 2), the rule engine enables alpha node hashing.

For each group of the mutually exclusive constraints, a unique numeric value is defined, and a directory entry is created to store the corresponding constraints, where each numeric value is associated to a distinct directory entry. Specifically, directory entry D1 is created to store constraints C1-C3, directory entry D2 is created to store constraints C4-C5, and directory entry D3 is created to store constraints C6-C8. Furthermore, directory entries D1, D2, and D3 are associated with numeric values one (1), two (2), and three (3), respectively. In addition to creating the directory entries D1-D3, the rule engine defines a hashcode function applicable to an attribute value of facts asserted. The attribute value is the value of an attribute of interest of the facts (e.g., the "type" attribute of a Customer fact, the "gender" attribute of a Patient fact, etc.).

When a fact F1 is asserted, the rule engine applies the hashcode function to the attribute value of F1 to generate a hash value. Then the rule engine compares the hash value against the numeric values associated with directory entries D1-D3. In the current example, suppose the hash value generated for F1 is two (2). Then the rule engine determines that the hash value matches the numeric value of directory entry D2. Based on the hash value, the rule engine may conclude that the constraints in the other directories (i.e., directory entries D1 and D3) will not evaluate to true against F1, and hence, the rule engine does not waste time and resources to evaluate these constraints (i.e., constraints C1-C3 and C6-C8). On the other hand, the constraints in directory entry D2 (i.e., constraints C4-C5) may evaluate to true against F1. Thus, the rule engine only evaluates the constraints in directory entry D2.

Using the above technique, instead of evaluating each of the constraints C1-C8 for each asserted fact, the rule engine applies the hashcode function to an attribute value of the fact to generate a hash value, and looks up the numeric values associated with the directory entries D1-D3. In other words, instead of evaluating eight constraints, the rule engine computes one hash value and compares the hash value against three numeric values associated with the directory entries D1-D3. The above technique may optimize the overall rule evaluation process when the number of facts asserted increases. For example, when there are a thousand facts asserted, only a thousand hash values are computed instead of evaluating eight thousands constraints. Performance of the rule engine is, therefore, greatly optimized or improved as the number of facts grows significantly. However, as computing the hash value may be more expensive than evaluating a single constraint or a few constraints in some situations, the above optimization is made dynamic in some embodiments. As discussed before, a hashing threshold may be set and alpha node hashing is enabled only when the number of mutually exclusive constraints rises above the hashing threshold. The hashing threshold may be a configuration parameter set by a rule engine administrator, thus becoming transparent to rule authors as well as applications that use the rule engine.

While the example illustrated in FIG. 3 involves a single hashing spot (with its single corresponding directory), a rulebase may have multiple instances of it and each of the instances may have alpha hashing enabled or disabled according to the predetermined hashing threshold. For example, suppose the predetermined hashing threshold has been set to three (3), and one exemplary rulebase contains the following pattern in rules:

Person(name=="Bob", city=="New York")
Person(name=="Mark", city=="New York")
Person(name=="Jane", city=="Washington")
Person(name=="Bob", city=="Washington")
Person(name=="Jill", city"Washington")
Person(name=="Jane", city=="New York")

In the above exemplary rulebase, there are two sets of constraints, one of which is applied to person.name and the other is applied to person.city. Thus, two different alpha hashing spots may be generated in the network, each with its own directory. The first alpha hashing directory has the following four (4) entries:
1. "name=='Bob'"
2. "name=='Mark'"
3. "name=='Jane'"
4. "name=='Jill'"

As four is over the hashing threshold (i.e., 3), alpha hashing is enabled for this directory.

The second directory has the following two (2) entries:
1. "city=='New York'"
2. "city=='Washington'"

The second directory is not hashed because the number of entries (i.e., 2) is below the hashing threshold (i.e., 3). However, if a new rule is added to the rulebase with the pattern Person(name=='Bob', city=='Seattle'), then no directory entry is added to the first hashing directory because the entry, name=='Bob' already exists in the first hashing directory. However, the entry "city=='Seattle'" is added to the second hashing directory, causing the number of entries to reach the hashing threshold (i.e., 3), and thus, alpha node hashing is enabled in response to the addition of this entry.

In sum, there may be multiple hashing spots and their associated directories in a single rulebase at the same time. Each directory may or may not be hashed, depending on the number of entries in the corresponding directory. Further, each entry may be associated with one or more constraints.

Figure 4:
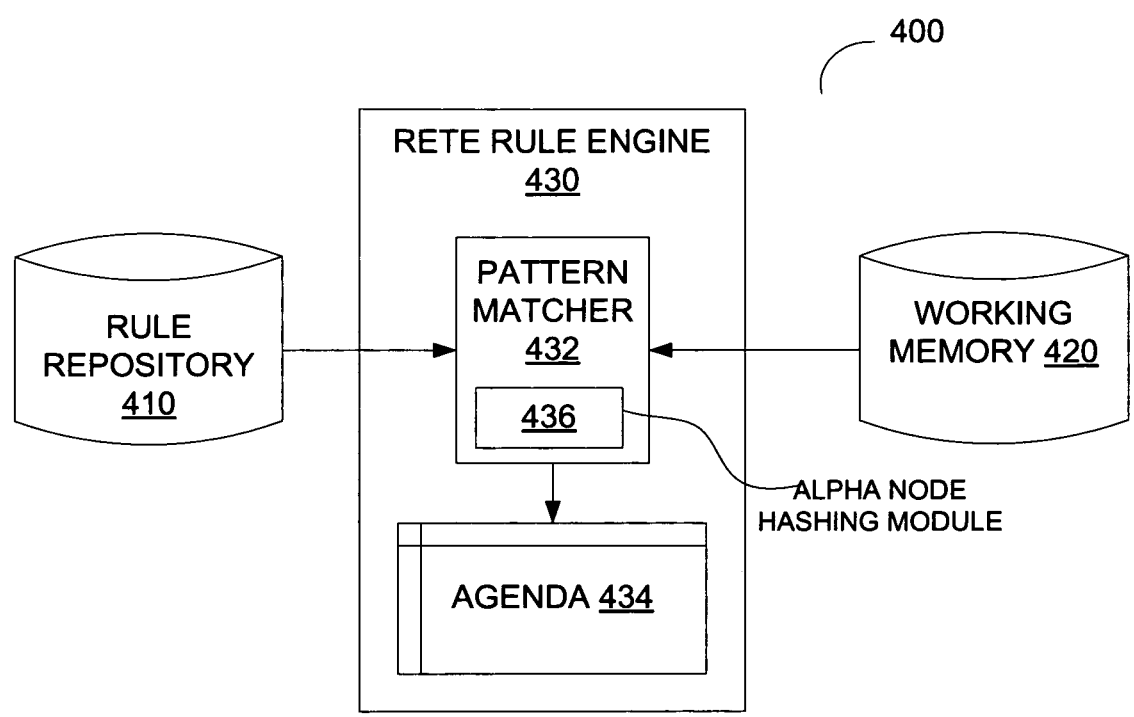
FIG. 4 shows one embodiment of a rule engine usable with some embodiments of the present invention.

FIG. 4 shows one embodiment of a rule engine with dynamic alpha node hashing. In some embodiments, a rule engine 430 is operatively coupled to a rule repository 410 and a working memory 420. The rule repository 410 stores a rule set having a number of rules, from which constraints may be derived. The rule repository 410 may also be referred to as a production memory. The working memory 420 stores facts (also referred to as data objects) that have been asserted.

In some embodiments, the rule engine 430 includes a pattern matcher 432 and an agenda 434. The pattern matcher 432 generates a network (such as a Rete network) to evaluate the rules from the rule repository 410 against the data objects from the working memory 420. One or more of the nodes within the network are alpha nodes for evaluating self-contained constraints. An alpha node hashing module 436 within the pattern matcher 432 dynamically enables alpha node hashing in response to a current number of mutually exclusive constraints on each level of the network. When the number of mutually exclusive constraints rises above a predetermined hashing threshold, the alpha node hashing module 436 may be enabled to perform alpha node hashing as described above. Details of some examples of alpha node hashing have been described above. By enabling alpha node hashing, the pattern matcher 432 may evaluate constraints more efficiently as the number of facts increases.

As the facts propagating through the network, the pattern matcher 432 evaluates the facts against the rules and/or constraints derived from the rules. Fully matched rules and/or constraints result in activations, which are placed into the agenda 434. The rule engine 430 may iterate through the agenda 434 to execute or fire the activations sequentially. Alternatively, the rule engine 430 may execute or fire the activations in the agenda 434 randomly.

Figure 5:
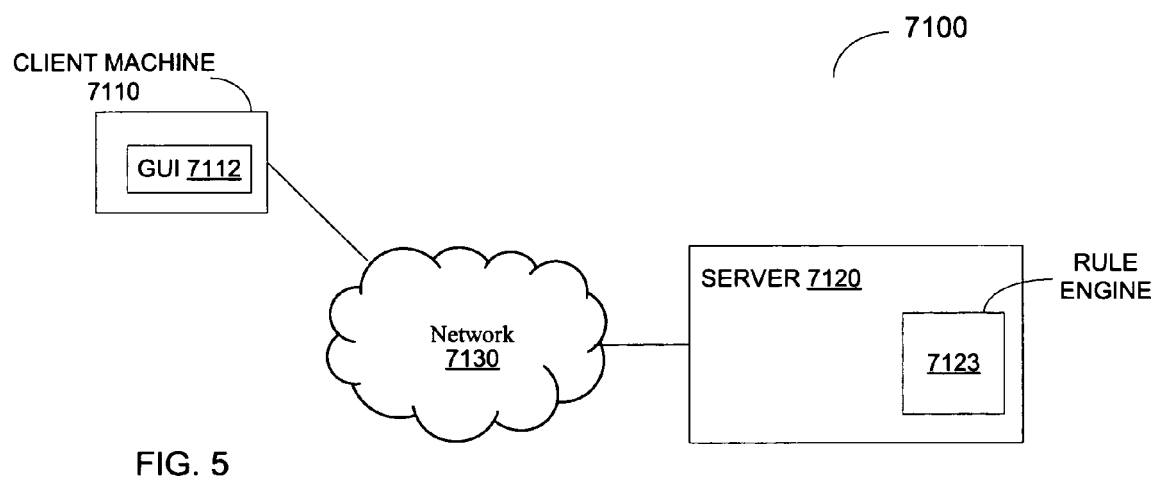
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having an architecture as illustrated in FIG. 4. The client machine 7110 may present a GUI 7112 (e.g., a webpage rendered by a browser) to allow users to input rule sets and/or data objects, which may be sent to the server 7120 to be processed using the rule engine 7123 as discussed above.

Figure 6:
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. In some embodiments, users may input files for rules using the GUI 7152. Then the files may be processed by rule engine 7153 as discussed above.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a computer-readable storage medium) on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of alpha node hashing in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   adding constraints into a constraint set in response to requests from one or more users of a rule engine;
   determining which constraints within the constraint set are mutually exclusive; and
   dynamically enabling hashing of a plurality of facts asserted into a working memory of the rule engine in response to a current number of the mutually exclusive constraints, wherein dynamically enabling hashing of the plurality of facts asserted comprises:
   enabling hashing of the plurality of facts asserted if the current number of the mutually exclusive constraints rises to or above a predetermined hashing threshold, and disabling hashing of the plurality of facts asserted if the current number of the mutually exclusive constraints falls below the predetermined hashing threshold.

2. The method of claim 1, wherein enabling hashing of the plurality of facts comprises:
   defining a unique numeric value for each of the mutually exclusive constraints within the constraint set; and
   defining a hashcode function operable to derive a hashcode from an attribute value of each of the plurality of facts.

3. The method of claim 1, further comprising:
   defining a hashing threshold based on input from an administrator of the rule engine.

4. The method of claim 1, further comprising:
   evaluating each of the plurality of facts against the constraints in the constraint set without directly applying the constraints to the facts.

5. The method of claim 1, further comprising:
   in response to a fact asserted into the working memory, applying a predetermined hashcode function an attribute value of the fact to generate a hash value if hashing is enabled; and
   evaluating one or more constraints associated with the hash value to true.

6. The method of claim 1, wherein the constraints are defined according to a plurality of business rules.

7. An apparatus comprising:
   a rule repository to store a set of rules, wherein a constraint set has a plurality of constraints defined according to the set of rules;
   a working memory to receive facts when facts are asserted; and
   a rule engine core coupled between the rule repository and the working memory to determine which constraints within a constraint set are mutually exclusive and to dynamically enable hashing of a plurality of facts asserted into the working memory in response to a current number of mutually exclusive constraints within the constraint set, wherein the rule engine core enables hashing of the plurality of facts asserted if the current number of the mutually exclusive constraints rises to or above a predetermined hashing threshold, and disables hashing of the plurality of facts asserted if the current number of the mutually exclusive constraints falls below the predetermined hashing threshold.

8. The apparatus of claim 7, wherein the rule engine core defines a unique numeric value for each of the mutually exclusive constraints within the constraint set, and further defines a hashcode function operable to derive a hashcode from an attribute value of each of the plurality of facts.

9. The apparatus of claim 7, wherein the rule engine core defines a hashing threshold based on input from an administrator of the rule engine.

10. The apparatus of claim 7, wherein the rule engine core evaluates each of the plurality of facts against the constraints in the constraint set without directly applying the constraints to the facts.

11. The apparatus of claim 7, wherein the rule engine core applies a predetermined hashcode function an attribute value of the fact to generate a hash value if hashing is enabled in response to a fact asserted into the working memory, and further evaluates one or more constraints associated with the hash value to true.

12. The apparatus of claim 7, wherein the constraints are defined according to a plurality of business rules.

13. A system comprising the apparatus of claim 7, further comprising:
    a user interface operatively coupled to the rule repository to receive the set of rules from a user, wherein the set of rules comprises a plurality of business rules for determining if an applicant qualifies for a mortgage.

14. A system comprising the apparatus of claim 7, further comprising:
    a server operable to execute the rule engine core; and
    a client machine communicatively coupled to the server via a network, the client machine comprising a user interface to receive the set of rules from a user and to send the set of rules to the server via the network.

15. A non-transitory computer-readable storage medium that provides instructions that, when executed by a processor, will cause the processor to perform operations comprising:
    adding constraints into a constraint set in response to requests from one or more users of a rule engine;
    determining which constraints within the constraint set are mutually exclusive; and
    dynamically enabling hashing of a plurality of facts asserted into a working memory of the rule engine in response to a current number of the mutually exclusive constraints, wherein dynamically enabling hashing of the plurality of facts asserted comprises:

enabling hashing of the plurality of facts asserted if the current number of the mutually exclusive constraints rises to or above a predetermined hashing threshold, and disabling hashing of the plurality of facts asserted if the current number of the mutually exclusive constraints falls below the predetermined hashing threshold.

16. The non-transitory computer-readable storage medium of claim 15, wherein enabling hashing of the plurality of facts comprises:

defining a unique numeric value for each of the mutually exclusive constraints within the constraint set; and defining a hashcode function operable to derive a hashcode from an attribute value of each of the plurality of facts.

17. The non-transitory computer-readable storage medium of claim 15, further comprising:

defining a hashing threshold based on input from an administrator of the rule engine.

18. The non-transitory computer-readable storage medium of claim 15, further comprising:

evaluating each of the plurality of facts against the constraints in the constraint set without directly applying the constraints to the facts.

19. The non-transitory computer-readable storage medium of claim 15, further comprising:

in response to a fact asserted into the working memory, applying a predetermined hashcode function an attribute value of the fact to generate a hash value if hashing is enabled; and evaluating one or more constraints associated with the hash value to true.

20. The non-transitory computer-readable storage medium of claim 15, wherein the constraints are defined according to a plurality of business rules.

* * * * *